United States Patent [19] [11] 4,084,745
Jones [45] Apr. 18, 1978

[54] WASTE HEAT UTILIZATION SYSTEM

[76] Inventor: Robert J. Jones, 2772 Salmon Dr., Los Alamitos, Calif. 90720

[21] Appl. No.: 709,024

[22] Filed: Jul. 27, 1976

[51] Int. Cl.² ............................................. F24D 3/08
[52] U.S. Cl. .................................... 237/8 R; 126/5; 126/299 R; 122/20 B; 165/DIG. 2
[58] Field of Search ................. 126/299 R, 132, 5; 165/DIG. 2, DIG. 12; 237/1 A, 51, 8 R; 122/20 B, 421, DIG. 1; 34/68

[56] References Cited
U.S. PATENT DOCUMENTS

| Re. 15,000 | 12/1920 | Stafford | 126/299 R X |
|---|---|---|---|
| 2,369,972 | 2/1945 | Meagher | 126/4 X |
| 2,376,173 | 5/1945 | Mueller | 126/4 X |
| 2,699,759 | 1/1955 | Kuhner | 122/421 |
| 3,194,308 | 7/1965 | Haried | 165/DIG. 12 |
| 3,896,992 | 7/1975 | Borovina et al. | 165/DIG. 2 |
| 3,899,581 | 6/1975 | Bray, Sr. | 126/299 E |

Primary Examiner—William E. Wayner
Assistant Examiner—William E. Tapolcai, Jr.
Attorney, Agent, or Firm—George J. Netter

[57] ABSTRACT

A heat exchanger is provided having coiled tubing and radiating fins about which hot flue gases for the cooking equipment circulate to heat a medium passing therethrough. Temperature control valves are selectively adjustable to pass the heated water along either of two sets of conduits for heating makeup air or heating water for use in the facility, respectively. These temperature control valves are set so that when the ambient room temperature is less than 70° F., the medium heated by the flue gases is passed through a second heat exchanger which intercepts incoming air to warm it before its admission in the building. When the temperature exceeds 70° F., the valves automatically switch to direct the heated medium to a third exchanger for heating tap water. A bypass arrangement recirculates the heat carrying medium through the primary heat exchanger until it achieves a predetermined temperature to prevent condensation.

6 Claims, 5 Drawing Figures

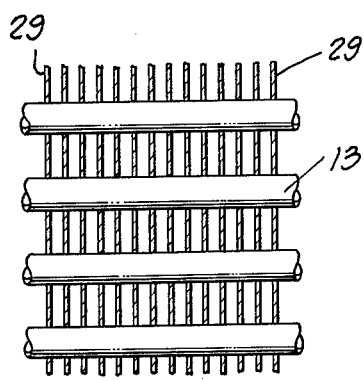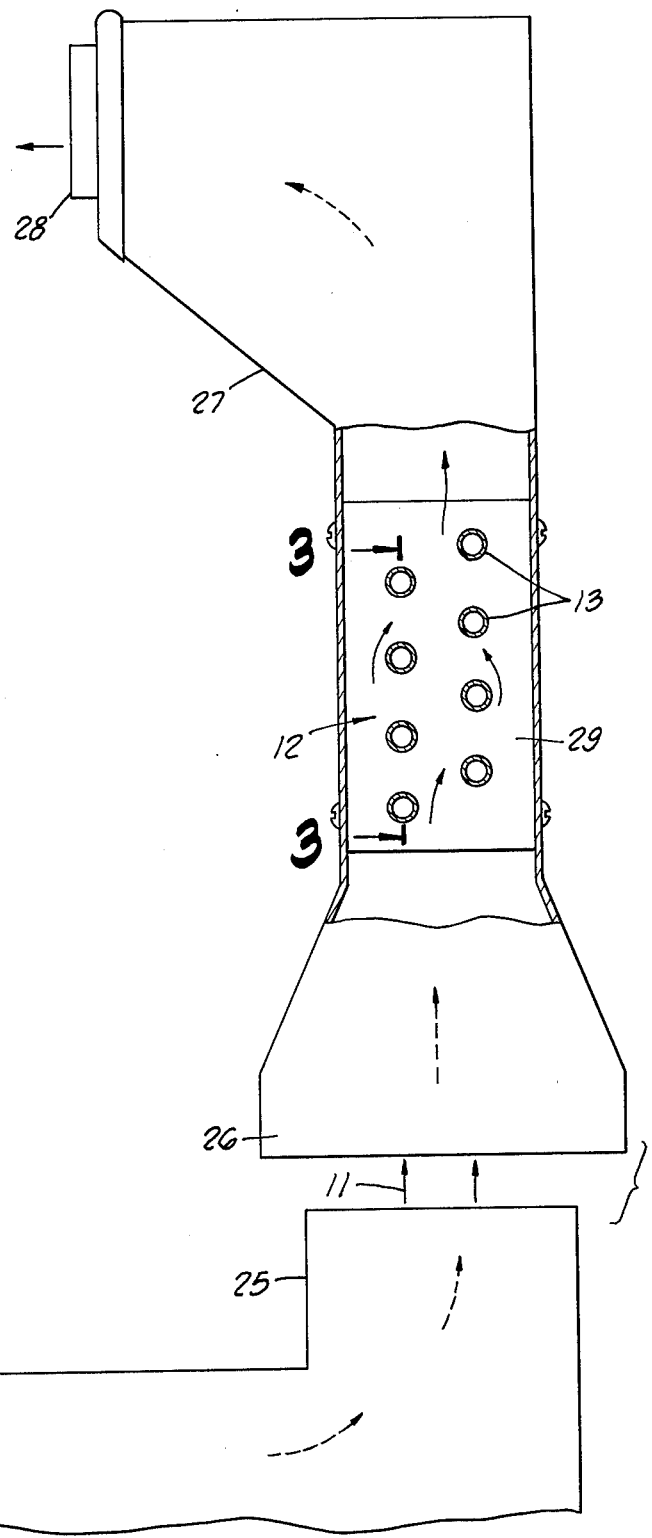

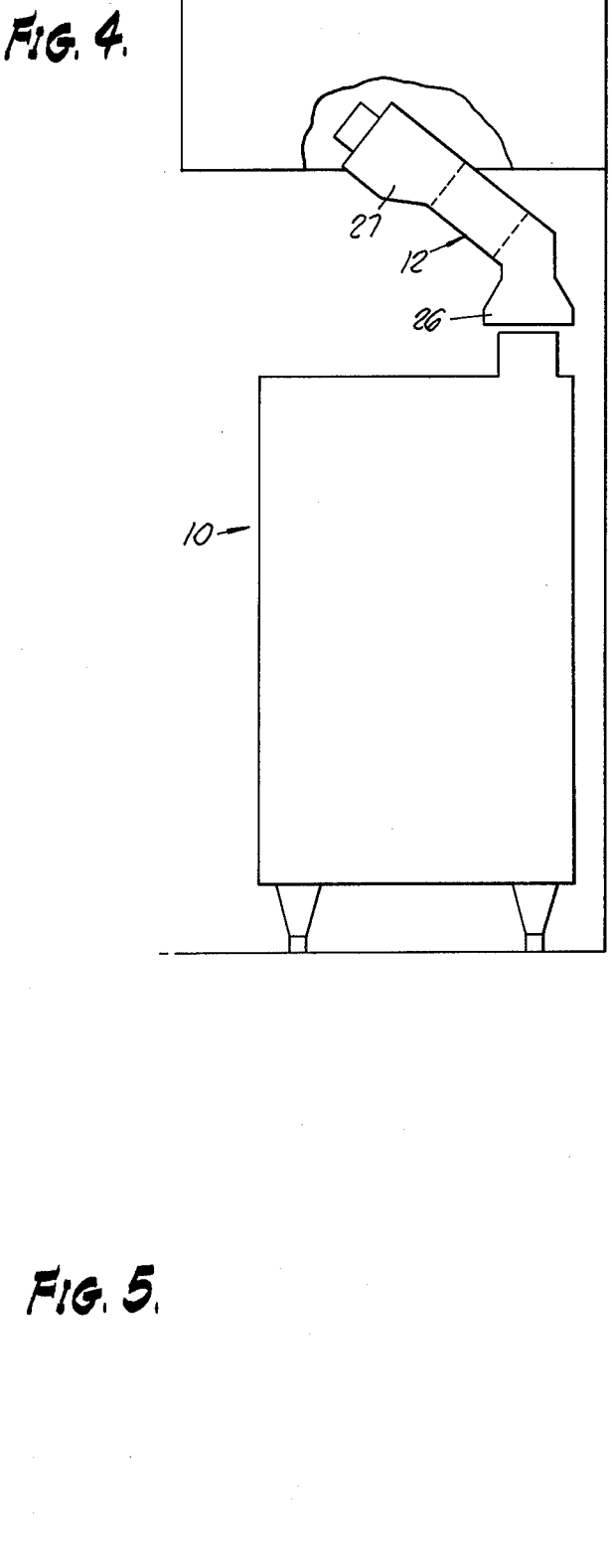

WASTE HEAT UTILIZATION SYSTEM

The present invention relates generally to a waste heat utilization system, and, more particularly, to such a system for recovering and utilizing waste heat from an institutional kitchen range, grill or the like.

BACKGROUND OF THE INVENTION

In the operation of commercial or institutional kitchens (e.g., restaurants, hospitals, schools), a substantial amount of the heat generated by the cooking equipment is wasted and lost with flue gases which are vented to the exterior of the building. In fact, due to the relatively large generation of heat, smoke and the like by such cooking units, a substantial problem is caused through the necessity for removal of these materials in the wintertime, particularly in more intemperate climates, where exhausting relatively large volumes of air from such a kitchen requires replacement with air which must be heated to bring it up to room temperature. Thus, for example, in the eastern and northern portions of the United States in the wintertime, external temperature can be quite low, and, therefore, makeup air brought into the kitchen from the outside may have to be heated more than 50° F. to achieve the usually desired 70° F. temperature. Moreover, throughout substantially the entire United States, during wintertime night-time hours of operation, makeup air must be heated.

In addition, the usual commercial or institutional kitchen has considerable need for hot water, and, in the past, this has only been met by the use of a separate source of energy, either fuel gas or electricity. Of course, the requisite energy for heating water to use in the kitchen or elsewhere in the facility is in addition to any other energy required for heating the makeup air already referenced.

As used herein, and in regard to which the subject invention is especially advantageous, the term "cooking equipment" shall preferably mean a gas-fired cooking stove or range, typically used in a commercial or institutional kitchen, and usually including a plurality of different heating sections, with open burners in certain sections, griddles in others, deep frying sections and ovens in still further sections. It is also contemplated that the term can embrace other gas-fired cooking devices such as enclosed broilers, steam cookers, steam generators and the like which are typically found in commercial and institutional kitchens.

OBJECTS AND SUMMARY OF THE INVENTION

It is, therefore, a primary object and aim of this invention to provide a system for recovering waste heat from cooking equipment and utilizing it both for heating water and for heating air or makeup air brought from the outside or other areas of the building into the room in which the cooking equipment is located, or where desired. In the practice of this invention, there is provided a heat exchanger unit consisting of coiled tubing and radiating fins about which hot flue gases from the range circulate to heat a medium passing therethrough. Temperature control valves are selectively adjustable to pass the heated water along either of two sets of conduits for heating makeup air or heating water for use in the facility, respectively. Specifically, these temperature control valves are adjusted such that when the ambient room temperature is, say, less than 70° F., the fluid heated by the flue gasses is passed through a second heat exchanger which intercepts incoming air to warm it before its admission in the building. When the temperature exceeds 70° F., and therefore the ambient temperature does not require heating, the valves automatically switch to direct the heated fluid through conduits to a third exchanger for increasing the temperature of tap water to provide hot water for use in the facility or elswhere as desired. A bypass arrangement recirculates the heat carrying medium through the primary heat exchanger until it achieves a predetermined temperature (110° F.) in order to prevent condensation.

DESCRIPTION OF THE DRAWINGS

FIG. 2 is an end elevational, partially sectional view of a range utilizing the subject invention.

FIG. 3 is a longitudinal sectional view taken along the line 3—3 of FIG. 2.

FIG. 4 is an alternate embodiment for use with cooking equipment installed in a low-ceiling room.

FIG. 5 is a further version in which the cooking equipment is installed in a high-ceiling room.

DESCRIPTION OF THE PREFERRED EMBODIMENTS

Figure 1:
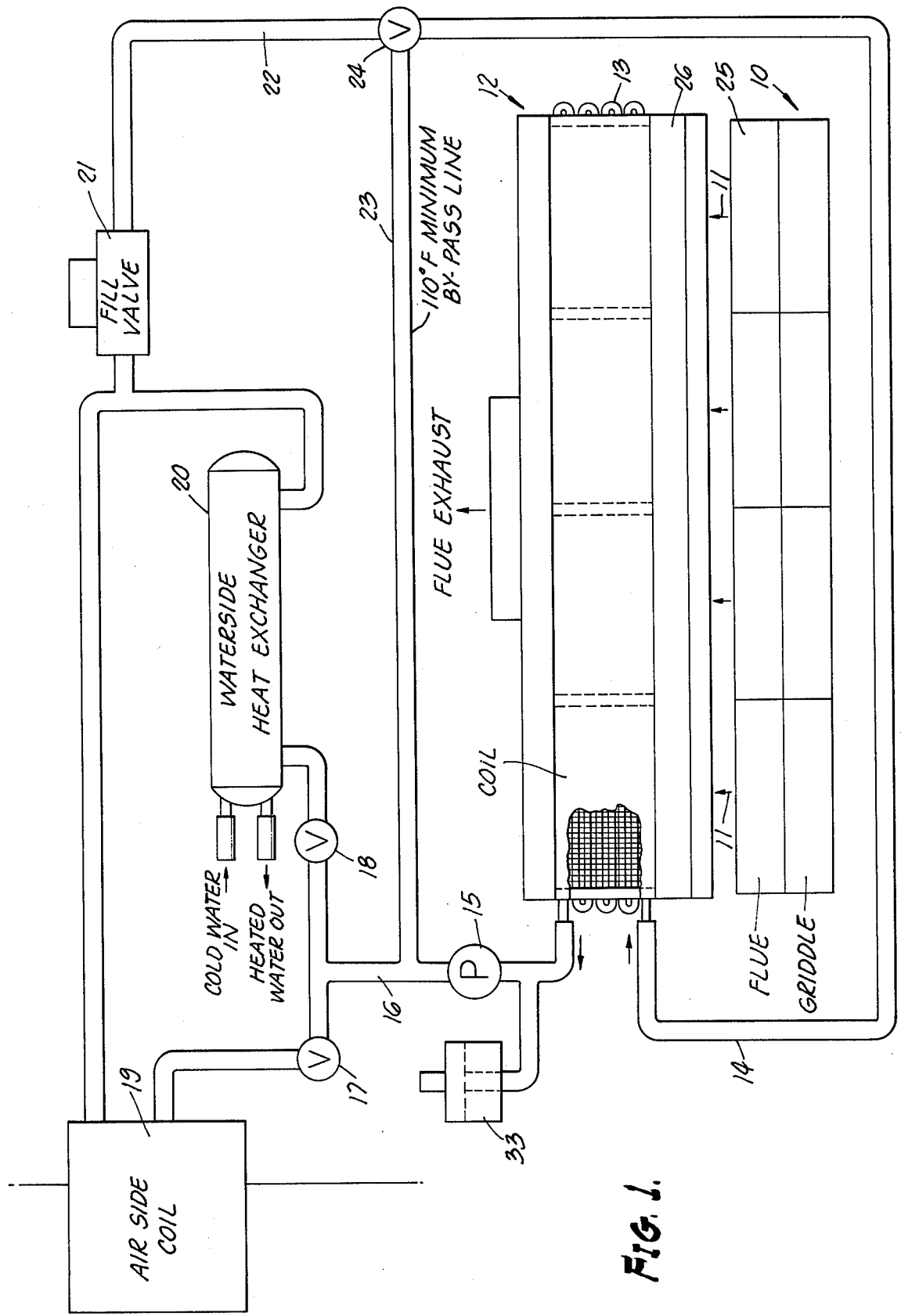
FIG. 1 is a schematic representation of the system of this invention.

With reference now to the drawings and particularly FIG. 1, the system of the present invention is shown with its major elements in schematic representation. The cooking equipment 10 is shown as having separate heating sections consisting of, for example, a griddle, deep fat fryer, or the like, from which flue gases are emitted as indicated generally by the arrows 11, and it is the heat which is contained in these flue gases and normally exhausted to the outside as waste that is recovered by the subject invention and utilized for the purposes described. The primary heat exchanger enumerated as 12 includes one or more sets of interconnected tubing formed into a coil 13 presenting a plurality of tubing lengths to the heating flue gases 11 passing therethrough. As will be more particularly described, the parts of the coil 13 are distributed lengthwise above the cooking equipment 10 such that the flue gases 11 contact them before being exhausted (either alone or in combination with the smoke and grease) as at FLUE EXHAUST.

The coil 13 is supplied with a heat carrying medium such as water via a conduit 14, which water is moved therealong and through the coil by means of a pump 15 in a conventional manner. The water, after passing through the coil 13 and in counterflow relation to the hot flue gases 11, then moves outwardly along a further conduit 16 to a pair of temperature controlled valves 17 and 18 where it is directed either to a heat exchanger 19 for warming incoming air (AIR SIDE COIL), or, alternatively, to a waterside heat exchanger 20 where tap water is heated for use in the facility or elsewhere, as desired. The primary medium, whether from either the airside coil 19 or the waterside heat exchanger 20, is then returned to the coil 13 through a fill valve 21 and conduit 22 for recirculating in the manner already described.

In addition, there is a bypass line 23 interrelating 16 and 22 via a three-way, temperature-responsive mixing valve 24. More particularly, the valve 24 is controlled by the temperature of the heat carrying medium to proportion medium from conduits 22 and 23 to 14 in order to maintain the temperature of the medium in the coil above a predetermined value. By this arrangement, the coil 13 is maintained above the temperature range in which undesirable condensation occurs. Where the medium is water or water with a small amount of additive, the condensation upper limit is approximately 110° F.

The temperature control valves 17 and 18 are two-way valves controlled by an element that is selectively adjustable to effect automatic switching of the valve condition in accordance with ambient room temperature. In the usual case, it will be desired to heat incoming makeup air when ambient room or building temperature drops below, say, 70° F. On the other hand, when the room temperature exceeds 70° F., it will not be desirable to heat the incoming air further, and therefore the valve 17 will block passage and valve 18 will direct the medium from the coils 13 to the waterside heat exchanger 20. The airside coil 19 can be of conventional construction and include a coil of tubing similar to 13 with fins such that the incoming air passing over the coils and fins will have its temperature increased by transference of heat from the medium, (e.g., water) passing therethrough. Also, the waterside heat exchanger can be of conventional construction and may preferably include a jacket containing the medium which encircles a conduit bearing the tap water, such that the relatively cold tap water will be heated. In both cases, counterflow arrangement is desirable for efficiency of exchange.

Although not essential to the operation of this invention, it may be desirable to provide additional means to cool, de-humidify and filter incoming air when the ambient room temperature exceeds, say, the 70°-75° F. range. Common ductwork may be employed for this additional air treating equipment and the invention.

Turning to FIG. 2, the cooking equipment 10 is seen to have an open-top part 25 at the back of the cooking equipment from which the hot flue gases 11 issue. An enlarged open-bottom hood 26 is located immediately above 25, collecting substantially all of the heated flue gases and directing them past the coil 13 for releasing the heat to the medium. The flue gases then pass into a plenum 27 from which they can be exhausted to the external atmosphere alone or along with grease and fumes, for example, picked up by a hood extending over the cooking equipment.

The hood 26, primary heat exchanger 12 and plenum 27 form a closed system such that incoming flue gases must pass upwardly through 12 and have no other exit than at 28.

Although other construction for the primary heat exchanger 12 may be found satisfactory, that shown in FIG. 3 is considered the most advantageous. Specifically, the coil 13 consists of hollow copper tubing formed into a plurality of parallel sections arranged in three-dimensional array. Thin finlike sheets 29 interrelate the various sections of the tubes transferring heat from the flue gases to the tubes by conduction.

Although water is a satisfactory heat-carrying medium for most purposes, it may be advisable under some circumstances to add other materials such as ethylene glycol, for example.

FIG. 4 depicts an alternative arrangement for use where there are height restrictions such as a low ceiling, or the cooking equipment is relatively high. As shown there, the hood 26 is located as in the first described embodiment, however, the coil 13 and plenum 27 are angularly disposed therefrom, thereby shortening the total vertical extension.

FIG. 5 shows a still further version in which the ceiling is relatively high. As shown there, the hood 26, coil 13 and plenum 27 are mutually located as in the FIG. 2 embodiment. In addition, there is provided an electrically operated blower fan 30 interconnected with the plenum 27 for drawing the flue gases therefrom and venting them upwardly along a further circuit 31 to be finally emptied into a grease and fume hood 32, for example.

Depending upon the particular circumstances of the installation, it may be advisable to also modify the versions shown in FIGS. 2 and 4 to include a fan as the fan 30 in FIG. 5.

It is also important to note that in each embodiment the hood 26 is maintained relative to the open-topped portion 25 of the cooking equipment in a slightly spaced and edge-overlapping relation. This is important in that it assures complete capture of the flue gases, and also provides a measure of adaptability for use with cooking equipment of different sizes.

There is provided in accordance with this invention apparatus for reclaiming flue gas heat from commercial or institutional cooking equipment and utilizing it to either heat makeup air of heat water, all accomplished automatically and under the control of an electrically operated presettable temperature responsive valving means.

The primary heat exchanger also includes means for self maintenance of a satisfactory temperature range preventing deleterious condensation. Furthermore, the system includes fill valve means to replace lost heat-carrying medium and an expansion tank 33 via which air is removed and which also serves as a safety release in the event excessive temperatures are achieved.

It is contemplated that the makeup air fan (not shown) used with each embodiment and any other fans (e.g., fan 30 and pump 15) will be interlocked for automatic operation whenever the cooking equipment is used. It is also desirable, particularly from a safety standpoint, that these items be interlocked with the grease and fume removal apparatus, either on a manual or automatic basis.

I claim:

1. A system for utilizing heat from the flue gases of gas-fired cooking equipment to heat incoming air to a room and tap water, comprising:

a hood located above and spaced from said cooking equipment;

means carrying a liquid medium therethrough located within said hood such that the flue gases from the cooking equipment pass thereover and transfer heat contained therein to the medium;

a first heat exchanger for transferring heat to a supply of air for a room;

a second heat exchanger for transferring heat to tap water;

a set of conduits interconnecting the liquid medium carrying means and the first and second heat exchangers for circulating the medium in a closed path; and first temperature responsive valving means interrelated with the conduits for passing the medium through the first heat exchanger and blocking passage through the second heat exchanger when the room temperature is below a predetermined value, and for passing the medium through the second heat exchanger and blocking passage through the first heat exchanger when the temperature is above the predetermined value; and a further conduit interconnected with said set of conduits and selectively actuatable by a second temperature responsive valving means for proportionately recirculating the medium through the liquid medium carrying means and through the first and second heat exchangers when the medium temperature is within a range at which condensation will occur on the medium carrying means.

2. A system as in claim 1, in which means are provided for admixing air with the flue gases immediately prior to contacting the medium carrying means.

3. A system as in claim 1, in which the flue gases are combined with the grease and fumes from the cooking equipment and exhausted together.

4. A system as in claim 1, in which the medium is water and the medium temperature range at which condensation will occur on the medium carrying means includes 110° F.

5. A system as in claim 1, in which the medium is water and ethylene glycol.

6. A system as in claim 1, in which a fan is provided in the hood above the medium carrying means for inducing flow of the flue gases and air past the medium carrying means.

* * * * *

UNITED STATES PATENT AND TRADEMARK OFFICE
CERTIFICATE OF CORRECTION

PATENT NO. : 4,084,745
DATED : April 18, 1978
INVENTOR(S) : Robert J. Jones

It is certified that error appears in the above-identified patent and that said Letters Patent are hereby corrected as shown below:

On the title page in item [56] References Cited,
"3,899,581    6/1975    Bray, Sr. ........126/299 E"
       should read
-- 3,889,581  6/1975    Bray.............126/299 E --.

Signed and Sealed this

Third Day of July 1979

[SEAL]

Attest:

LUTRELLE F. PARKER
*Attesting Officer*   *Acting Commissioner of Patents and Trademarks*